March 20, 1934.   J. P. KRIECHBAUM   1,951,663
FORCED CIRCULATION HEATING SYSTEM
Original Filed April 20, 1932   3 Sheets-Sheet 1

INVENTOR
JOHN P. KRIECHBAUM
By Paul, Paul & Moore
ATTORNEYS

March 20, 1934.    J. P. KRIECHBAUM    1,951,663
FORCED CIRCULATION HEATING SYSTEM
Original Filed April 20, 1932    3 Sheets-Sheet 2

INVENTOR
JOHN P. KRIECHBAUM
By Paul, Paul & Moore
ATTORNEYS

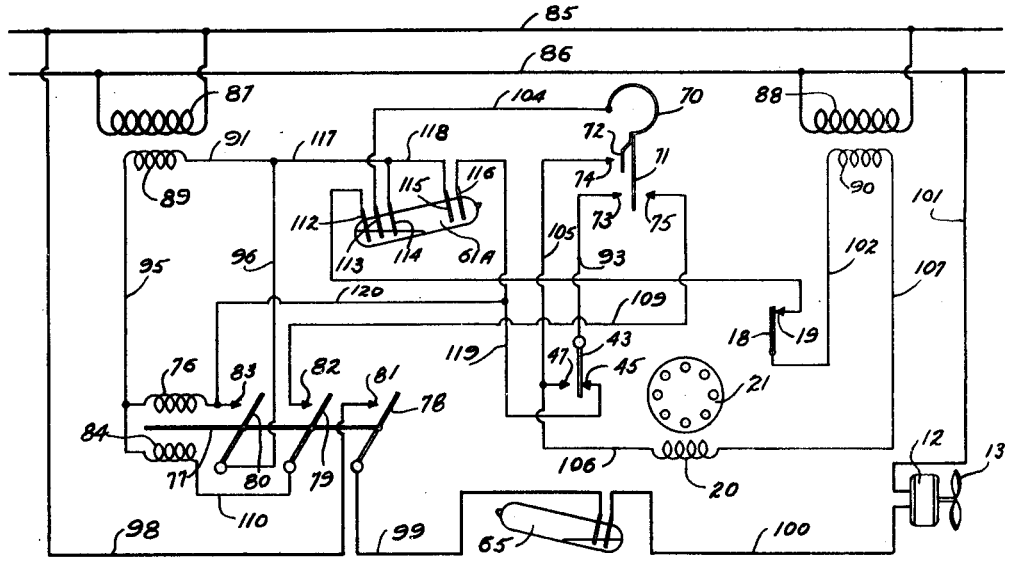

Patented Mar. 20, 1934

1,951,663

UNITED STATES PATENT OFFICE 1,951,663

FORCED CIRCULATION HEATING SYSTEM

John P. Kriechbaum, Minneapolis, Minn., assignor to Minneapolis-Honeywell Regulator Company, Minneapolis, Minn., a corporation of Delaware Application April 20, 1932, Serial No. 606,409
Renewed August 30, 1933

25 Claims. (Cl. 236—11)

The present invention relates to the type of heating system wherein the heat increasing means heats a fluid the circulation of which is controlled by a circulation controlling device. The invention relates particularly to the control of forced circulation hot air furnaces wherein the heated air is circulated by means of a blower device or fan.

One of the primary objects of the invention is the provision of a control system for a forced circulation hot air furnace whereby upon a fall in room temperature the heat increasing means will be operated to supply heat to the air and the blower device will be operated to circulate the heated air to the room or space to be heated including provision for maintaining the operation of the blower device after the room temperature has been restored to normal if the air at the furnace is above a predetermined maximum temperature. Provision is also made to prevent operation of the blower device if the temperature of the circulated air is below a predetermined minimum temperature even though the space to be heated is at a temperature below that desired.

A further object of the invention is to provide a control system for a forced circulation hot air furnace in which the blower device is operated to circulate heated air to the space to be heated when the temperature of the circulated air is sufficiently high upon a first fall in temperature in the space to be heated, to operate the heat increasing means for supplying heat to the circulated air upon a further drop in room temperature provided the temperature of the circulated air is not above or does not rise above a predetermined maximum, to stop operation of the heat increasing means when the temperature of the space to be heated has been partially restored, and to subsequently stop operation of the blower device when the temperature of the space to be heated has been fully restored.

A further object of the invention is to provide control systems such as outlined above which are relatively simple and are composed of standard apparatus that is available on the market.

Further objects of the invention will become apparent as the description thereof proceeds.

For further understanding of the invention reference may be had to the following description and accompanying drawings in which, Fig. 1 is a diagrammatic view of a forced circulation hot air furnace with my novel control system applied thereto;

Fig. 3 is a schematic wiring diagram showing a further type of control system which may be applied to the mechanism of Fig. 1;

Fig. 4 is a schematic showing of a control system similar to the system of Fig. 1, but in which a slightly different type of relay unit is utilized;

Figure 1:
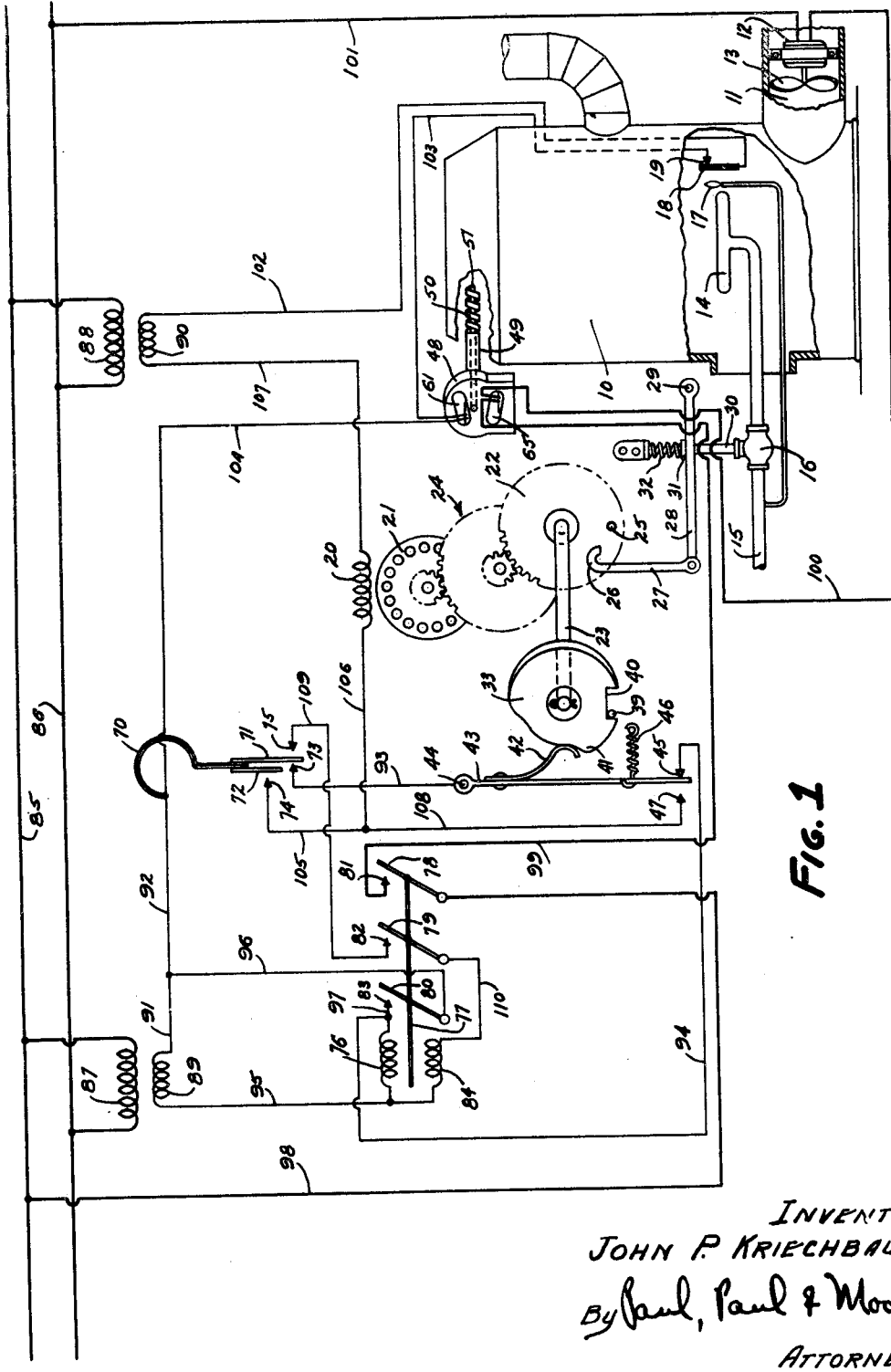

Referring to Fig. 1 a conventional type of hot air furnace indicated at 10 is provided with a cold air or recirculating air inlet indicated at 11. A motor 12 placed in the inlet 11 drives a fan 13 for circulating air through the furnace and into the space to be heated. The heat increasing means is herein shown as a burner 14 which is supplied with gas or other suitable combustible fluid by supply pipe 15 which in turn is controlled by a valve 16. The burner 14 is preferably supplied with a constantly burning pilot light indicated at 17. The pilot 17 preferably heats a bimetallic element 18 which when hot engages a contact 19 whereby operation of the system is prevented in the event that the pilot goes out as will hereinafter be explained.

Valve 16 is operated by an electric motor herein diagrammatically illustrated as being of the induction type as shown by the field coil 20 and rotor 21. Rotor 21 drives a gear 22 mounted upon a shaft 23 through reduction gearing generally indicated at 24. Gear 22 carries a pin 25 near its periphery which pin is adapted to engage the hooked end portion 26 of a rod 27 upon rotation of gear 22 in a clockwise direction. The lower end of rod 27 is pivotally secured to a lever 28 which in turn is pivoted as shown at 29. Valve stem 30 of valve 16 passes through lever 28 and is provided with an enlarged head 31 which is held biased in engagement with lever 28 by spring 32.

When field coil 20 is energized gear 22 is rotated clockwise by means of rotor 21 and reduction gearing 24 whereupon pin 25 engages hook 26 of rod 27 which in turn lifts lever 28 and valve stem 30 against the bias of spring 32 to open valve 16 and allow flow of gas to burner 14. When field coil 20 is deenergized spring 32 closes valve 16, moves lever 28 and rod 27 downwardly, and rotates gear 22 and rotor 21 in the reverse direction until the parts are brought back to their original position as shown in Fig. 1.

Figure 5:
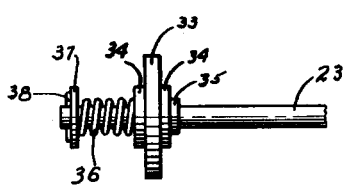
Fig. 5 is a detail of one of the devices diagrammatically shown in Fig. 1.

Referring to Fig. 5 it will be seen that shaft 23 carries a cam member 33 upon each side of which is positioned a friction washer 34. One of the friction washers 34 abuts a collar 35 on shaft 23 and the other friction washer 34 is engaged by one end of a coil spring 36 wound about shaft 23 and the other end of coil spring 36 presses against a washer 37, which is held in position on shaft 23 by cotter pin 38. The motion of cam member 33 is limited to a rather narrow range by a stationary pin 39 which cooperates with the edges of a recessed portion 40 formed in cam member 33. Cam member 33 is provided with a shoulder 41 upon which a cam follower 42 is adapted to ride when cam member 33 is rotated in a clockwise direction.

Cam follower 42 is secured to a lever 43 pivoted at 44 which is normally biased into engagement with a contact 45 by means of tension spring 46. When follower 42, however, rides up shoulder 41 contact arm 43 disengages contact 45 and engages a contact 47.

It will be noted that by reason of the frictional connection of shaft 23 and cam member 33 taken together with stop pin 39 and the recessed portion 40, cam member 33 will be moved to cause contact arm 43 to disengage contact 45 and engage contact 47 upon initial movement of gear 22 in a clockwise direction and after this circuit change has taken place, shaft 23 will continue rotating and cam member 33 will remain stationary. Likewise, the reverse action takes place causing contact arm 43 to disengage contact 47 and engage contact 45 upon initial movement of gear 22 in counter-clockwise direction.

Figure 6:
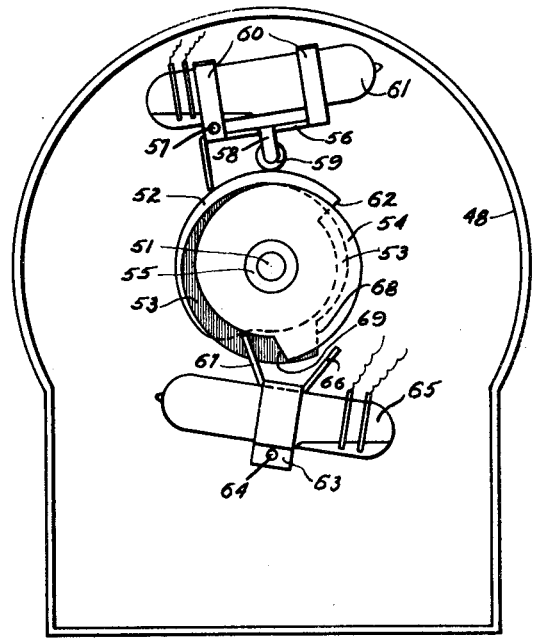
Fig. 6 is a view showing details of the furnace switch of Fig. 1.

The control system includes a thermostatic switch (see Figs. 1 and 6) which comprises a casing 48 provided with a lateral tubular extension 49 which terminates within the bonnet of furnace 10. An helically coiled bimetallic element 50 has one of its ends secured to extension 49 and has its other end secured to a rod 51 which extends through tubular extension 49 and terminates within casing 48. It will be obvious that bimetallic element 50 responds to the temperature of the air within the bonnet of furnace 10. Shaft 51 carries three cams 52, 53, and 54 which are adjustably secured to the shaft 51 by thumb nut 55. A bracket 56 is pivoted to casing 48 as shown at 57 and is provided with a downward extension 58 which carries a roller 59. Bracket 56 is also provided with upwardly extending clips 60 which carry a mercury switch 61 which will hereinafter be referred to as the "high limit switch". It will be seen that pivot 57 is removed from the center of bracket 56 so that the weight of bracket 56 and high limit switch 61 always maintains roller 59 in contact with the periphery of cam 52. The cam 52 is provided with the shoulder 62 so that upon rotation of cam 52 in a counter-clockwise direction as a result of excessive temperature in the furnace 10, high limit switch 61 will be allowed to rotate in a clockwise direction about its pivot 57 to open circuit position. A bracket 63 which is pivoted to casing 48 as shown at 64 supports a mercury switch 65 which will hereinafter be referred to as the "fan switch". Bracket 63 is provided with upwardly extending arms 66 and 67 the former of which is adapted to be engaged by a shoulder 68 on cam 53 upon temperature rise and the latter of which is adapted to be engaged by a shoulder 69 on cam 54 on a temperature fall at bimetallic element 50. Inasmuch as fan switch 65 has its central portion secured to bracket 63, this assembly will remain in either open or closed position after having been moved thereto by shoulder 69 or shoulder 68. After having been moved to either open or closed position bracket 63 and fan switch 65 are prevented from rotating an undue amount by engagement of arm 66 or 67 as the case may be with the periphery of cam 53 or 54.

The control system also includes a room thermostat comprising a bimetallic volute 70 to the free end of which are secured flexible contact blades 71 and 72. On a lowering of room temperature flexible blade 71 first engages the contact 73 and subsequently flexible blade 72 engages contact 74. When the room temperature rises flexible blade 72 first leaves contact 74, flexible blade 71 subsequently leaves contact 73 and when the room temperature has been restored to normal flexible blade 71 engages a contact 75.

The control system also includes a standard relay means of the double coil type. Coil 76 upon energization attracts armature 77 which in turn moves switch arms 78, 79, and 80 into engagement with contacts 81, 82, and 83. A bucking coil 84 when energized neutralizes the magnetic effect of coil 76 thereby allowing armature 77 to move to the position of Fig. 1 under the action of gravity.

*Operation*

Line wires 85 and 86 continuously supply electrical energy to transformers having primaries 87 and 88 and low voltage secondaries 89 and 90.

In Fig. 1 the parts are shown with the pilot 17 burning, the fan 13 stationary, the valve 16 closed, and the room temperature falling. The temperature of the heated air is high enough that fan switch 65 has been moved to closed position and is low enough that high limit switch 61 is also in closed position. As the room temperature continues to fall blade 71 will first engage contact 73 which establishes an energizing circuit for coil 76 as follows: secondary 89, wires 91, 92, element 70, blade 71, contact 73, wire 93, contact arm 43, contact 45, wire 94, coil 76, and wire 95 to secondary 89. Energization of coil 76 attracts armature 77 and moves switch arms 78, 79, and 80 into engagement with contacts 81, 82, and 83. Engagement of contact arm 80 with contact 83 establishes the following holding circuit for coil 76: secondary 89, wires 91, 96, contact arm 80, contact 83, wire 97, coil 76, and wire 95 to secondary 89. Engagement of contact arm 78 with contact 81 energizes fan motor 12 as follows: line 85, wire 98, contact arm 78, contact 81, wire 99, fan switch 65, wire 100, fan motor 12, and wire 101 to line 86. Operation of fan 13 by motor 12 will force any heated air remaining in the furnace 10 into the room in an attempt to restore the room temperature to normal. If the temperature of the air in the furnace 10 should be lower than the temperature at which it is desired to supply air to the room, the fan switch 65 would be in open circuit position and fan motor 12 would not be energized.

Assuming that there was not sufficient heat in furnace 10 to prevent further fall in room temperature, contact blade 72 will engage contact 74 to establish an energizing circuit for field 20 as follows: secondary 90, wire 102, element 18, contact 19, wire 103, high limit switch 61, wire 104, element 70, blade 72, contact 74, wire 105, wire 106, field 20, and wire 107 to secondary 90. It will be seen that this energizing circuit for field 20 includes element 18 and contact 19 so that valve 16 can not be opened if pilot 17 is extinguished. Energization of field 20 opens valve 16 as hereinbefore described and gas is supplied to burner 14 and ignited by pilot 17. Opening of valve 16 also moves contact arm 43 from engagement with contact 45 and into engagement with contact 47.

Engagement of contact arm 43 with contact 47 establishes a holding circuit for field 20 which is as follows: secondary 90, 102, 18, 19, 103, 61, 104, 70, blade 71, contact 73, wire 93, contact arm 43, contact 47, wire 108, 106, field 20, and 107 to secondary 90. It will be seen that energization of field 20 is accomplished by engagement of blade 72 with contact 74, but that field 20 is maintained energized by the holding circuit just described until blade 71 leaves contact 73. It will be obvious that if high limit switch 61 is in open position because of excess bonnet temperatures in the furnace 10, field coil 20 cannot be energized or will be deenergized subsequent to energization if high limit switch 61 should open after field 20 has been energized.

Since heat is being supplied by burner 14 and this heat is being circulated to the room by fan 13, the room temperature will begin to rise. When blade 72 leaves contact 74 there will be no change in the system because of the holding circuit for field 20, but when the room temperature has risen sufficiently to cause blade 71 to leave contact 73 the field 20 will be deenergized and valve 16 will move to closed position under the bias of spring 32 thereby cutting off the supply of fuel to burner 14. The closing of valve 16 also rotates cam member 33 in counter-clockwise direction permitting spring 46 to move contact arm 43 from engagement with contact 47 and into engagement with contact 45 as above described. Fan 13 is still being operated and will deliver the heat remaining in furnace 10 into the room. If this heat is sufficient to cause element 70 to move blade 71 into engagement with contact 75, an energizing circuit for relay coil 84 will be established as follows: secondary 89, 91, 92, 70, blade 71, contact 75, wire 109, contact 82, switch arm 79, wire 110, coil 84, and wire 95 back to secondary 89. Coil 84 when energized creates a magnetic flux equal and opposite to the magnetic flux created by coil 76. The effective magnetism on armature 77 is zero so that armature 77 and its associated switch arms 78, 79, and 80 will move to the position of Fig. 1 under the influence of gravity bringing the system back to its original condition.

From the foregoing description of Fig. 1 it will be observed that on a first fall in temperature the fan 13 is operated to remove any heat from furnace 10 that might be present. If this heat is sufficient to restore the room temperature so that blade 71 engages contact 75, fan 13 will cease operating. If there is no heat in the furnace, operation of fan 13 is prevented by means of fan switch 65. If there is no heat in the furnace so that fan 13 can not be operated or if the heat present in the furnace is not sufficient to prevent a further fall in room temperature, blade 72 engages contact 74 and valve 16 is opened to supply fuel to burner 14 provided pilot 17 is not extinguished. Valve 16 will remain open until the room temperature has been partially restored so as to cause blade 71 to leave contact 73 provided the furnace temperature is not or does not become excessive in which case high limit switch 61 will cause closure of valve 16. When the room temperature has been fully restored engagement of blade 71 with contact 75 causes a complete shut down of the system.

Figure 2:
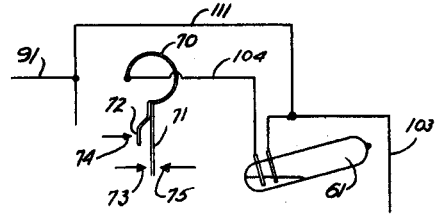
Fig. 2 is a diagrammatic view showing certain modifications which may be made in the control system of Fig. 1.

It is conceivable that with certain types of furnaces and with certain types of heat-increasing means the furnace temperature may become excessive after the heat-increasing means has been operated to decrease the supply of heat to the furnace as indicated by blade 71 leaving contact 73 and before the room thermostat becomes fully satisfied as indicated by blade 71 engaging contact 75. Under such conditions it may be desirable to continue fan operation even after the room temperature has been restored. Fig. 2 shows a slight change in the wiring connections of Fig. 1 by which this result may be accomplished. The initial energizing circuit for coil 76 and the energizing circuit for coil 84 after leaving wire 91, go by way of a wire 111 to high limit switch 61 and then through wire 104 to element 70. By this arrangement neutralizing coil 84 can not be energized if high limit switch 61 is open when blade 71 engages contact 75. The fan 13 will, therefore, remain energized until the excessive furnace temperature is reduced if the furnace temperature is excessive when blade 71 engages contact 75.

In Fig. 3 a further modification is shown whereby fan 13 is operated whenever the furnace temperature is excessive regardless of the condition of the room thermostat. This circuit arrangement is to take care of the possibility of the furnace temperature becoming excessive after the room thermostat has become satisfied as indicated by blade 71 engaging with contact 75. In this figure high limit switch 61A is provided with three terminals 112, 113, and 114 all of which are closed when the furnace temperature is not excessive and the high limit switch 61A is further provided with terminals 115 and 116 which are closed when the furnace temperature becomes excessive.

With the parts as shown the room is cooling, the furnace temperature is such that fan switch 65 is closed, and high limit switch 61A is positioned so as to close terminals 112, 113, 114 and element 18 is in engagement with contact 19 showing that pilot 17 is burning. The control system of Fig. 3 works exactly the same as the control system of Fig. 1 except that if the furnace temperature should become excessive while the room thermostat is satisfied and blade 71 is in engagement with contact 75, fan 13 is operated to reduce the furnace temperature. Under such conditions high limit switch 61A would move to a position wherein terminals 115 and 116 would be connected. Coil 76 would then be energized as follows: secondary 89, 91, 117, 118, 115, 116, 119, 120, coil 76, and 95 to 89. Energization of coil 76 moves switch arms 78, 79, and 80 into engagement with their respective contacts 81, 82, and 83 to establish a holding circuit for coil 76 and to operate fan 13 as above described.

When the excess heat has been removed from the furnace, high limit switch 61A will move to the position shown in Fig. 3 whereupon neutralizing coil 84 will be energized as follows: secondary 89, 91, 117, 114, 113, 104, 70, 71, 75, 109, 82, 79, 110, 84, and 95 to 89. It will be apparent then that the arrangement of Fig. 3 gives the two-stage control of Fig. 1 plus the added feature of operating fan 13 upon excessive furnace temperature even though the room is at normal temperature. This is an added safeguard which prevents over-heating of the furnace even at the expense of a slight over-heating in the room.

Fig. 4 is a circuit arrangement which operates exactly in the same manner as the circuit of Fig. 1, but the relay unit operates a single switch arm 129 which engages a contact 130 that controls both the holding circuit for coil 76 and conditions the circuit for coil 84 for energization upon engagement of blade 71 with contact 75. In other words, switch arm 129 and contact 130 replaces switch arms 79 and 80 and contacts 82 and 83 of Fig. 1 by the use of a slightly different wiring arrangement.

When blade 71 engages contact 73 coil 76 is energized as follows: 89, wire 121, wire 94, contact 45, arm 43, wire 93, contact 73, blade 71, element 70, wire 122, wire 123, coil 76, and 95 to secondary 89. Energization of 76 causes switch arm 79 to engage contact 81 and switch arm 129 to engage contact 130. Fan motor 12 is thus energized in the same manner as in Fig. 1 and a holding circuit for coil 76 is established as follows: secondary 89, wires 121, 124, contact 130, switch arm 129, wire 123, coil 76, and 95 to 89. When blade 72 engages contact 74, field 20 is energized as in Fig. 1, and the subsequent engagement of contact arm 43 with contact 47 establishes a holding circuit for field 20 as in Fig. 1. When the room temperature has been restored so that blade 71 engages contact 75 an energizing circuit for coil 84 is established as follows: secondary 89, wires 121, 124, contact 130, switch arm 129, wire 122, element 70, blade 71, contact 75, wire 125, coil 84, and wire 95 to 89.

The arrangement of Fig. 4, therefore, eliminates one of the switches of the circuit of Fig. 1. It is to be understood that this same rearrangement could be made in Figs. 2 and 3.

While the fan switch 65 and high limit switch 61 have been shown as mercury switches and the remaining switching mechanisms have been shown as open contacts, it is to be understood that either mercury switches or open contacts could be used throughout the circuit arrangements of Figs. 1 to 4 inclusive.

It should be noted that while two transformers have been shown in these various circuits a single transformer could be substituted if desired. Two transformers have been shown herein since the transformer 87—89 in commercial practice is built into the relay unit which includes coils 76 and 84. In order to use transformer 87 and 89 to operate the whole circuit it would be necessary to increase its size thereby requiring a special relay which could not readily be obtained on the market. Likewise, transformer 88—90 is transmitted with the valve mechanism and the same objection to increasing the size of this transformer to eliminate the other transformer holds good.

In Figs. 1, 2, 3, and 4 similar reference characters have been used to indicate like parts and wiring connections.

I claim as my invention:

1. A system of the class described, comprising, in combination, a heat increasing means, a circulation controlling device for controlling the circulation of the fluid heated by the heat increasing means, a thermostat responsive to the temperature of the space to be heated, connections between the space- temperature-responsive thermostat and the circulation controlling device for causing circulation of the heated fluid to the space to be heated when the temperature thereof falls to a predetermined point, thermostatically controlled means subject to the temperature of the heated fluid for preventing such circulation if the fluid is below a predetermined minimum temperature, connections between the space-temperature-responsive thermostat and the heat increasing means for operating the same to suppy heat to the fluid upon a further drop in temperature at the space to be heated, and thermostatically controlled means responsive to the temperature of the heated fluid for preventing such operation of the heat increasing means if the fluid is above a predetermined maximum temperature which is higher than the aforesaid minimum temperature.

2. A system of the class described, comprising, in combination, an electrical device for controlling the circulation of a fluid, a switch in circuit therewith, a thermostat responsive to the temperature of the space to be heated for closing said switch to operate said device when the temperature of the space to be heated falls to a predetermined point, thermostatically controlled means responsive to the temperature of the fluid for preventing circulation of the fluid if the temperature thereof is below a predetermined minimum, an electrically operated heat increasing means for heating the fluid to be circulated, a space-temperature-responsive switch in circuit therewith and moved to closed position for supplying heat to the fluid upon a further fall in the temperature of the space to be heated, and means responsive to the temperature of the fluid for preventing operation of the heat increasing means if the fluid is above a predetermined maximum temperature which is higher than the aforesaid minimum temperature.

3. A system of the class described, comprising, in combination, a heat increasing means, a circulation controlling device for the fluid heated by the heat increasing means, a room thermostat, connections between the room thermostat and circulation controlling device for operating the same to cause circulation of fluid upon a first fall in room temperature, connections between the room thermostat and the heat increasing means for operating the same to supply heat to the fluid upon a further fall in room temperature, and thermostatic means responsive to the heated fluid for preventing operation of the heat increasing means to supply heat to the fluid when the temperature thereof is above a predetermined maximum.

4. A system of the class described, comprising, in combination, a heat increasing means, a circulation controlling device for the fluid heated by the heat increasing means, connections between the room thermostat and the circulation controlling device for operating the same to cause circulation of fluid upon a lowering of the room temperature to a first value and for preventing circulation when the room temperature rises a predetermined amount above said first value, connections between the room thermostat and the heat increasing means for operating the same to supply heat to the fluid upon a further fall in room temperature to a second value lower than the first value and for stopping such operation when the room temperature rises a predetermined amount above the second value, and means responsive to the temperature of the heated fluid for preventing operation of the heat increasing means when the temperature of the fluid is above a predetermined maximum.

5. A system of the class described, comprising, in combination, a heat increasing means, a circulation controlling device for the fluid heated by the heat increasing means, a room thermostat subject to the temperature of the room, connections between the room thermostat and said circulation controlling device and heat increasing means for causing circulation of fluid and heating thereof upon fall in room temperature and for preventing such circulation of fluid and heating thereof when the room temperature has been restored, and means responsive to the temperature of the circulating fluid for continuing circulation of fluid after the room temperature has been restored if the temperature of the fluid is above a predetermined maximum.

6. A system of the class described, comprising, in combination, a heat increasing means, a circulation controlling device for the fluid heated by the heat increasing means, a room thermostat subject to the temperature of the room, connections between the room thermostat and said circulation controlling device and heat increasing means for causing circulation of fluid and heating thereof upon fall in room temperature and for preventing such circulation of fluid and heating thereof when the room temperature has been restored, and means responsive to the temperature of the circulating fluid for operating said circulation controlling device to cause circulation of fluid if the temperature thereof rises above a predetermined maximum after the room temperature has been restored.

7. A control system for a hot air furnace including an electrically operated heat increasing means and an electrical blower device for circulating the air heated thereby, comprising, a room thermostat, switching mechanism operated thereby for controlling said means to produce heat and for controlling said blower device to circulate the heated air when the room temperature falls, a thermostat in the path of the heated air, and switching mechanism operated by said last named thermostat for continuing operation of said blower device after the room temperature has been restored if the temperature of the heated air is above a predetermined maximum.

8. A control system for a hot air furnace including an electrically operated heat increasing means and an electrical blower device for circulating the heated air thereby, comprising, a room thermostat, switching mechanism operated thereby for controlling said means to produce heat and for controlling said blower device to circulate the heated air when the room temperature falls, a thermostat in the path of the heated air, and switching mechanism operated by said last named thermostat for operating said blower device if the temperature of the heated air rises above a predetermined maximum after the room temperature has been restored.

9. A control system for a forced circulation hot air furnace including an electrically operated heat increasing means and an electrical blower for circulating the heated air, comprising, a room thermostat, switching mechanism operated thereby for starting the air blower when the room temperature falls to a first value, for operating said heat increasing means to supply heat to the circulating air when the room temperature falls to a second value, and for discontinuing operation of the air blower and heat increasing means when the room temperature has been restored, a thermostat responsive to furnace temperature, and switching mechanism controlled by said furnace-temperature-thermostat for operating the air blower upon excessive furnace temperatures when the room temperature has been restored.

10. A system of the class described, comprising, in combination, an electrically operated heat increasing means biased to one position and movable to another position against its bias when energized, an electrical circulation controlling device for controlling the circulation of fluid heated by the heat increasing means, switching mechanism operated by said heat increasing means, thermostatically controlled switching mechanism responsive to the temperature of the space to be heated, a relay means, a switch operated thereby, an energizing circuit for the circulation controlling device controlled by the relay switch, a circuit for energizing the relay means to move the relay switch to closed circuit position on a fall in temperature of the space to be heated including the thermostatically controlled switching mechanism and the heat increasing means operated switching mechanism and a circuit for energizing the heat increasing means to produce heat upon a further fall in the temperature of the space to be heated controlled by the thermostatically controlled switching mechanism.

11. A system of the class described, comprising, in combination, an electrically operated heat increasing means, an electrical circulation controlling device for controlling the circulation of fluid heated by the heat increasing means, switching mechanism in control of said device, relay means for operating said switching mechanism, a circuit changer operated by the heat increasing means, a room thermostat, an energizing circuit for the relay means including the room thermostat and heat increasing means circuit changer, a fluid temperature operated switching means, an energizing circuit for the circulation controlling device including the relay means operated switching mechanism and the fluid temperature operated switching means, and an energizing circuit for the heat increasing means including the room thermostat and the fluid temperature operated switching means.

12. A system of the class described, comprising, in combination, a room thermostat, first and second contacts sequentially engageable thereby on temperature fall, a third contact engageable thereby on temperature rise after the first and second contacts have been disengaged, an electrical heat increasing means biased to one position and electrically operable for movement to a second position, a circuit changer controlled by the heat increasing means, relay means, an energizing circuit for the relay means including the room thermostat, its first contact and the heat increasing means circuit changer, a plurality of switches controlled by the relay means, a holding circuit for the relay means including one of the relay means controlled switches, an energizing circuit for the heat increasing means including the room thermostat and its second contact, a holding circuit for the heat increasing means including the room thermostat, its first contact and the heat increasing means circuit changer, and means for operating the relay means for causing the same to assume its first position including the room thermostat, its third contact and one of the relay means controlled switches.

13. A system of the class described, comprising, in combination, a room thermostat, first and second contacts sequentially engageable thereby on temperature fall, a third contact engageable thereby on temperature rise after the first and second contacts have been disengaged, an electrical heat increasing means biased to one position and electrically operable for movement to a second position, a circuit changer controlled by the heat increasing means, relay means including first and second coils, an energizing circuit for one of said relay coils including the room thermostat, its first contact and the heat increasing means circuit changer, a plurality of switches moved to closed position on energization of said relay coil, a holding circuit for said relay coil including one of said relay switches, an electrically operated fan, a fan switch, an energizing circuit for the fan including the fan switch and another of the relay switches, a high limit switch, an energizing circuit for the heat increasing means including the room thermostat, its second contact and the high limit switch, a holding circuit for the heat increasing means including the room thermostat, its first contact, the high limit switch and the heat increasing means circuit changer and an energizing circuit for the other relay coil for opening the relay switches including the room thermostat, and one of the relay controlled switches.

14. A system of the class described, comprising, in combination, a room thermostat, first and second contacts engageable thereby on temperature fall, a third contact engageable thereby on temperature rise after the first and second contacts have been disengaged, an electric fluid control valve normally biased to closed position, a circuit changer operable by the valve on opening and closing thereof, relay means including first and second relay coils, an energizing circuit for the first relay coil including the room thermostat, its first contact and the valve operated circuit changer, first, second and third switches moved to closed position upon energization of the first relay coil, a holding circuit for the first relay coil including the first relay operated switch, an electrical blower, a circuit for the blower including the second relay switch, an energizing circuit for the valve including the room thermostat and its second contact, a holding circuit for the valve including the room thermostat, its first contact and the valve operated circuit changer, and an energizing circuit for the second relay coil for moving the relay switches to open position including the room thermostat, its third contact, and the third relay operated switch.

15. A system of the class described, comprising, in combination, a room thermostat, first and second contacts engageable thereby on temperature fall, a third contact engageable thereby on temperature rise after the first and second contacts have been disengaged, an electrical heat increasing means, a circuit changer operable thereby, relay means comprising first and second relay coils, a high limit switch, an energizing circuit for the first relay coil including the high limit switch, the room thermostat, its first contact, and the heat increasing means operated circuit changer, a plurality of switches moved to closed position upon energization of the first relay coil, a holding circuit for the first relay coil including one of the relay operated switches, an electrical blower, a circuit for the blower including another of the relay operated switches, an energizing circuit for the heat increasing means including the room thermostat, its second contact and the high limit switch, a holding circuit for the heat increasing means including the room thermostat, its first contact, the heat increasing means circuit changer and the high limit switch, and a circuit for the second relay coil for causing opening of the relay operated switches including the room thermostat, its third contact, the high limit switch and one of the relay operated switches whereby the relay switches will remain closed if the high limit switch is open when the room thermostat engages its third contact.

16. A system of the class described, comprising, in combination, a room thermostat, first and second contacts engageable thereby on temperature fall, a third contact engageable thereby on temperature rise after the first and second contacts have been disengaged, an electrical heat increasing means, biased to one position and electrically operable to a second position, a circuit changer controlled by the heat increasing means, a relay means comprising first and second relay coils, a first source of power, an energizing circuit for the first relay coil including the room thermostat, its first contact the first source of power and the heat increasing means controlled circuit changer, an electrical circulation controlling device, a plurality of switches moved to closed position by said first relay coil when energized, a second source of power, an energizing circuit for the circulation controlling device including the second source of power and one of the relay operated switches, a third source of power, an energizing circuit for the heat increasing means comprising the room thermostat, its second contact and the third source of power, a holding circuit for the heat increasing means including the room thermostat, its first contact, the third source of power and the heat increasing means controlled circuit changer, and an energizing circuit for the second relay coil for opening the relay operated switches including the first source of power, the room thermostat, its third contact and one of the relay operated switches.

17. A system of the class described, comprising, in combination, a room thermostat, first and second contacts engageable thereby on temperature fall, a third contact engageable thereby on temperature rise after the first and second contacts have been disengaged, an electrical heat increasing means biased to one position and electrically operable to a second position, a circuit changer controlled by the heat increasing means, a relay means comprising first and second relay coils, a first source of power, an energizing circuit for the first relay coil including the room thermostat, its first contact the first source of power and the heat increasing means controlled circuit changer, an electrical fan, a fan switch, a plurality of switches moved to closed position by said first relay coil, a second source of power, an energizing circuit for the fan including the second source of power, fan switch, and one of the relay operated switches, a third source of power, a high limit switch, an energizing circuit for the heat increasing means including the third source of power, high limit switch, room thermostat and its second contact, a holding circuit for the heat increasing means including the third source of power, high limit switch, room thermostat, its first contact and the heat increasing means controlled circuit changer, and a circuit for the second relay coil for causing opening of the relay switches including the first source of power, the room thermostat, its third contact and one of the relay operated switches.

18. A system of the class described, comprising, in combination, a room thermostat, first and second contacts engageable thereby on temperature fall, a third contact engageable thereby on temperature rise after the first and second contacts have been disengaged, an electrical heat increasing means, biased to one position and electrically operable to a second position, a circuit changer controlled by the heat increasing means, a relay means comprising first and second relay coils, a source of power comprising high voltage supply lines, a first step-down transformer connected to the supply lines and having only sufficient capacity to operate the relay means, a circuit for the first relay coil including the first step-down transformer, the room thermostat, its first contact and the heat increasing means controlled circuit changer, a plurality of switches moved to closed position by the first relay coil when energized, an electrical circulation controlling device, a circuit therefore including the supply lines and one of the relay operated switches, a second step-down transformer having only sufficient capacity to operate the heat increasing means and connected to the supply lines, an energizing circuit for the heat increasing means including the second step-down transformer, the room thermostat and its second contact, a holding circuit for the heat increasing means including the second step-down transformer, the room thermostat, its first contact and the heat increasing means controlled circuit changer, and a circuit for the second relay coil for causing opening of the relay switches including the first step-down transformer, the room thermostat, its third contact and one of the relay operated switches.

19. A system of the class described, comprising, in combination, a room thermostat, first and second contacts engageable thereby on temperature fall, a third contact engageable thereby on temperature rise after the first and second contacts have been disengaged, an electrical heat increasing means, biased to one position and electrically operable to a second position, a circuit changer controlled by the heat increasing means, a relay means comprising first and second relay coils, a source of power comprising high voltage supply lines, a first step-down transformer connected to the supply lines and having only sufficient capacity to operate the relay means, a circuit for the first relay coil including the first step-down transformer, the room thermostat, its first contact and the heat increasing means controlled circuit changer, first and second switches moved to closed position by the first relay coil when energized, a holding circuit for the first relay including the first step-down transformer and the first relay operated switch, an electrical circulation controlling device, a circuit therefor including the supply lines and the second relay operated switch, a second step-down transformer having only sufficient capacity to operate the heat increasing means, an energizing circuit for the heat increasing means including the second step-down transformer, room thermostat, and its second contact, a holding circuit for the heat increasing means including the second step-down transformer, the room thermostat, its first contact and the heat increasing means controlled circuit changer, and a circuit for the second relay coil for causing opening of the relay switches including the first step-down transformer, the room thermostat, its third contact and the first relay operated switch.

20. A system of the class described comprising, a circulation controlling device for fluid to be heated, a room thermostat, means responsive to the temperature of the fluid, connections between the circulation controlling device, room thermostat and fluid-temperature-responsive means for operating the fluid circulation controlling device upon a first fall in room temperature if the temperature of the fluid is sufficiently high, a pilot light, a pilot thermostat, a second means responsive to fluid temperature, a heat increasing means for heating the fluid, and connections between the heat increasing means, room thermostat, pilot thermostat and second fluid-temperature-responsive means for operating the heat increasing means upon a further fall in room temperature if the pilot is lighted and the fluid temperature is not excessive.

21. A system of the class described, comprising, in combination, a circulator for circulating a fluid medium, a main control for operating said circulator in response to changes in the condition to which said main control responds, a heater for changing the heat value of said fluid medium, and means responsive to the heat value of said fluid medium for operating said circulator when the heat value of said fluid medium is too high.

22. A system of the class described, comprising, in combination, a circulator for circulating a fluid medium, a main control for operating said circulator in response to changes in the condition to which said main control responds, a heater for changing the heat value of said fluid medium, and means responsive to the heat value of said fluid medium for preventing operation of said circulator by the main control if the heat value of said fluid medium is too low and for operating said circulator irrespective of the main control if the heat value of the fluid medium is too high.

23. In combination, a heater for heating a fluid medium, electrically operated means for controlling the circulation of said fluid medium, a main control switch in control of said electrically operated means for operating the latter in accordance with changes in the condition to which said main control switch responds, and switching means responsive to the heat content of said fluid medium and associated with said main control switch and electrically operated means for preventing operation of the latter by the main control switch when the heat content of the fluid medium is too low and for operating the same irrespective of the value of the condition to which said main control switch responds when the heat content of the fluid medium is too high.

24. A system of the class described, comprising, in combination, a heat increasing means, a circulation controlling device for the fluid heated by the heat increasing means, a thermostat subject to the temperature of the space to be heated, connections between the space temperature thermostat and circulation controlling device for causing the circulation of fluid upon a fall in the space temperature and for preventing such circulation of fluid when the space temperature has been restored, means responsive to the temperature of the circulating fluid for continuing circulation of the fluid after the space temperature has been restored if the temperature of the fluid is above a predetermined maximum and means responsive to the temperature of the circulating fluid for terminating operation of the heat increasing means if the temperature of the fluid becomes too high.

25. A system of the class described, comprising, in combination, an electrically operated heat increasing means, an electrical circulation controlling device for the fluid heated by the heat increasing means, a circuit closing thermostat subject to the temperature of the space to be heated, connections between the space temperature thermostat and circulation controlling device for operating the latter when the space temperature falls to a predetermined minimum and for terminating operation of the circulation controlling device when the space temperature has been restored, and thermostatic switching means responsive to the temperature of the circulating fluid for terminating operation of the heat increasing means and for operating the circulation controlling device when the temperature of the circulating fluid reaches a predetermined maximum irrespective of the temperature of the space to be heated.

JOHN P. KRIECHBAUM.